United States Patent

[11] 3,619,518

| [72] | Inventors | Charles H. Blanch<br>Maple Heights;<br>James W. Kovacik, Parma, both of Ohio |
|---|---|---|
| [21] | Appl. No. | 859,701 |
| [22] | Filed | Sept. 22, 1969 |
| [45] | Patented | Nov. 9, 1971 |
| [73] | Assignee | Alert Stamping and Mfg., Inc.<br>Bedford Heights, Ohio |

[54] ELECTRIC CORD REEL CONSTRUCTION
11 Claims, 8 Drawing Figs.

[52] U.S. Cl. ................................................ 191/12.2 R
[51] Int. Cl. ........................................................ H02g 11/02
[50] Field of Search .......................................... 191/12.2;
242/107.7

[56] References Cited
UNITED STATES PATENTS

| 2,391,840 | 12/1945 | Meletti .......................... | 242/107.7 |
| 2,565,452 | 8/1951 | Johnson et al. ................ | 191/12.2 |
| 2,745,912 | 5/1956 | Meyer ........................... | 191/12.2 |
| 2,926,865 | 3/1960 | Humphreys ................... | 191/12.2 |
| 2,948,913 | 8/1960 | Tamarin ........................ | 191/12.2 |
| 3,056,995 | 10/1962 | Tamarin et al. ............... | 191/12.2 |
| 3,432,623 | 3/1969 | Blanch et al. ................. | 191/12.2 |
| 3,450,369 | 6/1969 | Blanch et al. ................. | 242/107.7 |

Primary Examiner—Evon C. Blunk
Assistant Examiner—I. Kenneth Silverman
Attorney—Bosworth, Sessions, Herrstrom & Cain ABSTRACT: An improved electric cord reel construction of simplified structure is provided that is lightweight, relatively inexpensive to manufacture and assemble, and requires no lubrication. Most of the component parts of the reel are molded from plastic and have combined features normally supplied by additional, different parts secured together by various fasteners, thereby avoiding in the present structure the usual overall heavy, relatively bulky assembly. One important plastic component of the present construction is a plastic hub portion having an integral plastic flange adjacent one end and an internal plastic wall member extending generally radially across the hub portion to divide it into housing chambers on opposite sides of the wall member. The remaining parts are mounted with respect to this component.

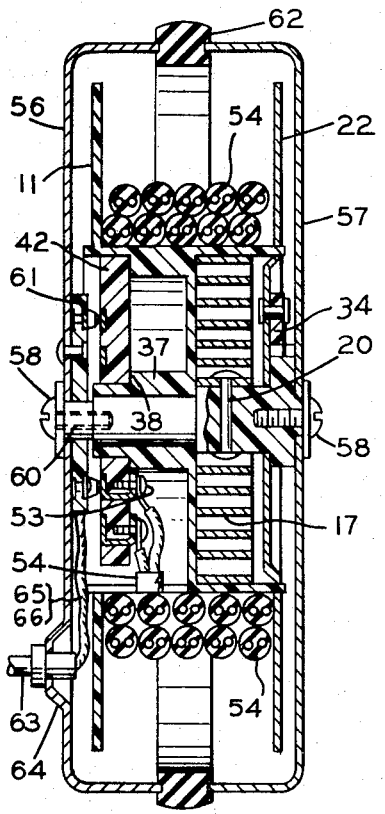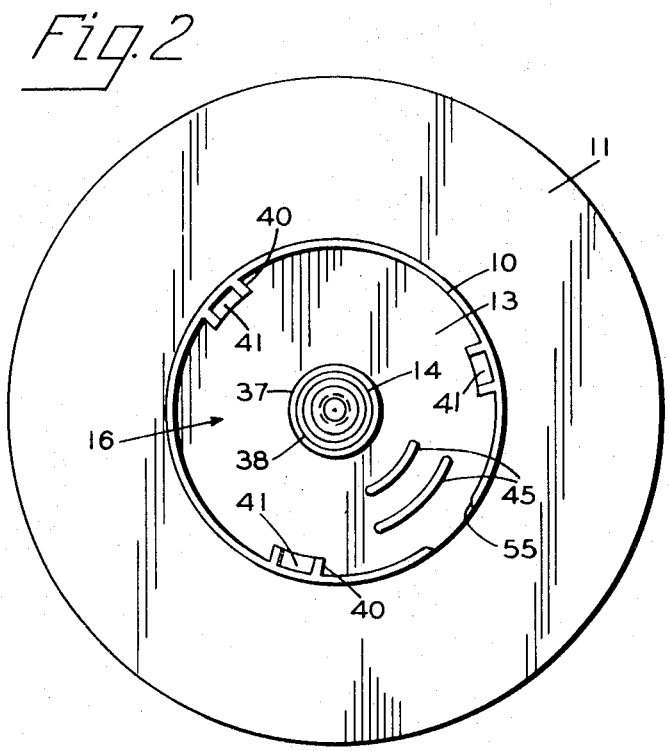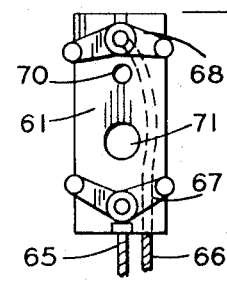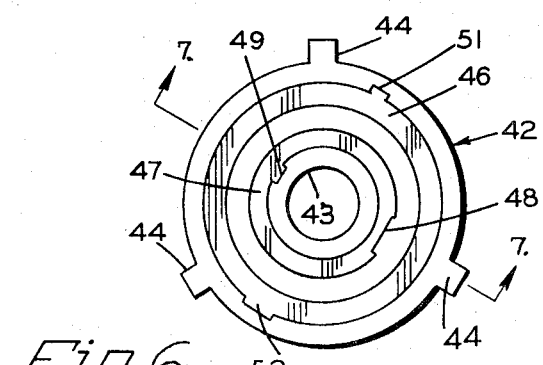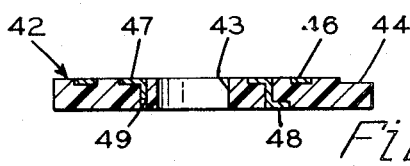
INVENTORS.
CHARLES H. BLANCH
JAMES W. KOVACIK
BY Bosworth, Sessions,
Herström + Cain
ATTORNEYS.

INVENTORS.
CHARLES H. BLANCH
JAMES W. KOVACIK
BY Bosworth, Sessions,
Herrshtrom + Cain
ATTORNEYS.

ELECTRIC CORD REEL CONSTRUCTION

BACKGROUND OF THE INVENTION

The present invention relates to electric cord reels and, more particularly, to such reels of improved, simplified structure embodying relatively lightweight parts adapted for quick assembly.

Electric cord reels have been in use for many years, such as for paying out and receiving electric cord for lead lights, various electrical household appliances like sweepers, and in general wherever insulated electric conductors are to be optionally extended and retracted with respect to a relatively stationary point. While exterior designs may vary, electric cord reels basically comprise a reel and shaft, mounted to rotate relatively to each other; cooperating ratchet and pawl means carried by the shaft and reel, respectively, to arrest the turning of a reel at one of several selective rotary stations when the length of the cord paid out reaches a desired length; a coiled spring designed to rotate the reel in a backward direction and rewind the cord onto the reel when the ratchet and pawl are disengaged; and electrical input means including a commutator and the insulated electrical cord itself.

To date, many parts of such reels have been individually fabricated requiring individual stampings for each. Further, since reels are commonly hand-assembled, mass production techniques have been hampered because relatively more parts must be secured, one to the other, in the process of building a complete unit. All of this complicates and renders more expensive the commercial production of the reel structures.

It would, therefore, advance the art if an electric cord reel of simple construction were available and especially one of relatively lightweight parts which, additionally, so combined the features and functions of several parts of prior structures that mass assembly was appreciably facilitated.

SUMMARY OF THE INVENTION

In the present electric cord reel, the number of individual parts is reduced by uniquely combining in several instances parts of prior reel structures and making them as one integral part. Assembly is, therefore, facilitated. Moreover, there need be no soldering or welding in assembling the present cord reel, and the use of rivets and screws is minimized. Still further, certain of the combined parts are molded from plastics as a single, integral part, thereby eliminating stampings for the several parts and contributing to a lightweight structure without loss of strength for the intended purpose.

In one form, the present electric cord reel comprises a plastic hub portion having an integral plastic flange adjacent one end, and an internal plastic wall member extending generally radially across the hub portion to divide it into housing chambers on opposite sides of the wall member. A second flange is attached to the free end of the hub portion, and a shaft extends through the flanges, substantially coaxial of the hub portion for relative rotation therewith. A coiled spring is stationed in one of the housing chambers, and a commutator block is carried in the other. Ratchet and pawl means are carried, respectively, by he shaft and one of such flanges.

BRIEF DESCRIPTION OF THE DRAWINGS

The accompanying drawings illustrate a presently preferred embodiment wherein:

FIG. 1 is a radial, cross-sectional view of an electric cord reel assembly;

FIG. 2 is a side elevational view of a plastic hub and flange member of the reel of FIG. 1 and shows a housing chamber for a commutator block;

FIG. 5 is a side elevational view of the combined, plastic shaft and ratchet;

FIG. 6 is a side elevational view of a commutator block adapted to fit in the housing shown in FIG. 2;

FIG. 7 is a section of FIG. 6 on the line 7—7; and

FIG. 8 is a fragmentary view of a contact block for maintaining a constant electrical connection between an electric current supply and the commutator of FIG. 6.

DESCRIPTION OF THE PREFERRED EMBODIMENT

Figure 4:
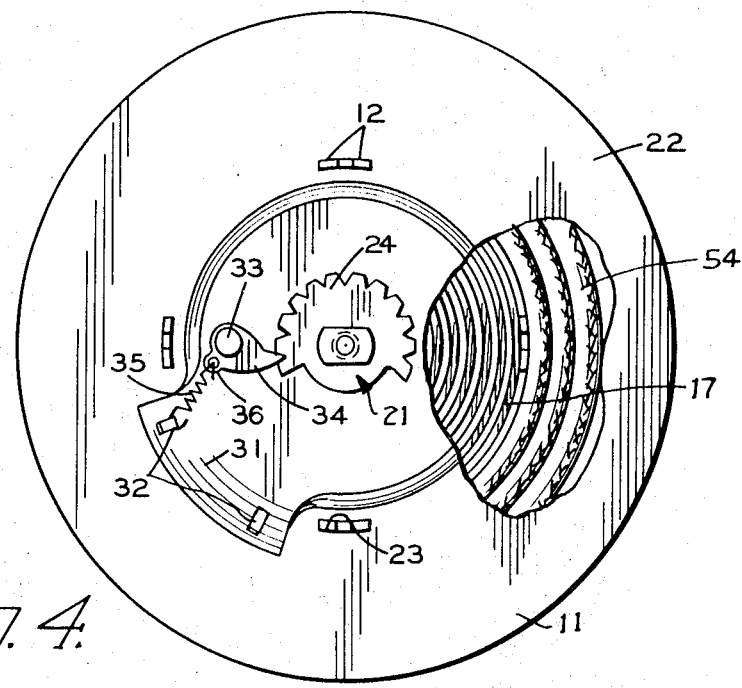
FIG. 4 is a side elevational view, with parts broken away, of a second flange after attachment to the free end of the plastic hub portion shown in FIG. 3.

Referring to the drawings, the embodiment illustrated includes a molded plastic hub portion 10 having a plastic integral flange 11 adjacent one end and a plurality of axially extending, circumferentially spaced tab portions 12 at its other, free end. Substantially midway between such ends, a wall member 13 having a shaft opening 14 extends generally radially across the hub portion 10 to divide it into separate housing chambers generally indicated at 15 and 16 on opposite sides of the wall member.

As used here and in the claims, the term "plastic" is taken to mean any of the well-known, synthetic, organic, resinous polymers suitable for molding. As an example, such plastics may include the acrylic polymers such as polymethyl methacrylate; the cellulosic molding compounds such as ethyl cellulose, cellulose acetate, cellulose acetate butyrate, and cellulose nitrate; polyethylene; polypropylene; polystyrene; polyvinyl polymers such as polyvinyl chloride, polyvinylidene chloride, polyvinyl acetate, polyvinyl alcohol, polyvinyl butyral, and copolymers thereof; polyurethanes; melamine-formaldehyde and urea-formaldehyde molding compounds; phenol-formaldehyde and phenol-furfural molding compounds; polyesters; epoxy resins; polytetrafluorethylene; and the like. Polyamides such as nylon are preferred.

A spirally coiled spring 17 concentrically fits within housing chamber 15. An arcuate rib or vane 18 integral with the wall member 13 is secured as by riveting to an outer end of the spring 17, while a rivet 20 (FIG. 1) secures an inner end of the spring to a shaft generally indicated at 21. A second flange 22, essentially equal in size to flange 11, has slotted, rectangular openings 23 spaced peripherally to receive the tabs 12 of the free end of the hub portion 10. If desired, the openings 23 and tabs 12 may be dimensioned to provide a tight, frictional press fit. Or, if desired, when the plastic of the hub portion 10 is thermoplastic, the tabs 12 may be heat-sealed over the outer face of flange 22 after it is seated in position. Depending upon the physical demands to be placed on the electric cord reel during use, flange 22 can be either plastic or metal. When plastic, flange 22 can be of the same or different plastic as that used for any of the other plastic parts. To rigidify and strengthen the overall assembly, it is preferred to make flange 22 from metal, such as galvanized sheet metal.

Figure 3:
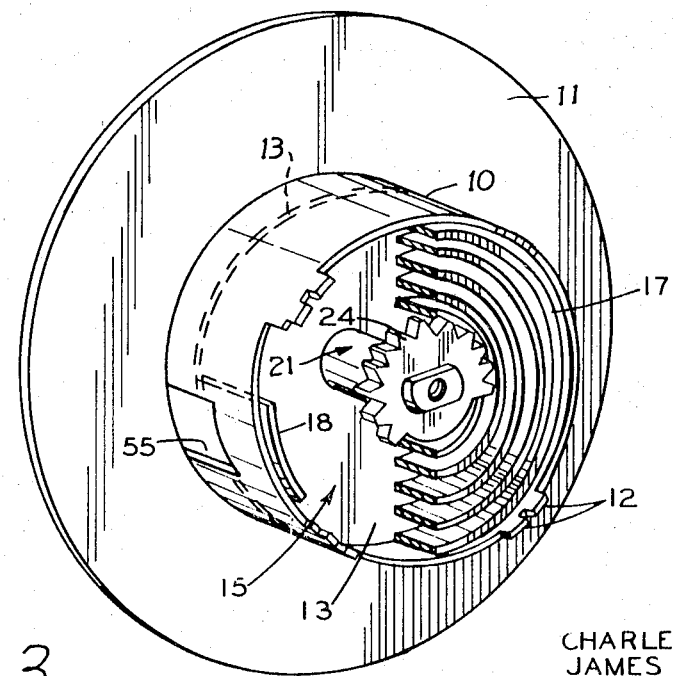
FIG. 3 is a perspective view of the reversed side of the plastic hub and flange member of FIG. 2 and illustrates a housing chamber for a coiled spring, the spring being shown in half-section for purposes of illustration

In the preferred form, a shaft and ratchet are also combined and molded from plastic as one piece. As shown especially in FIGS. 3 and 5, the shaft generally indicated at 21 comprises a ratchet configuration 24 molded integrally with shaft extension 25. The latter has an opening 26 to receive the rivet 20 securing a section of the coiled spring 17 to the shaft, as well as successively narrowing offset sections 27 and 28. Offset section 27 defines a seat for abutting the shaft against the wall member 13 from the side of chamber 15 as shown in FIG. 3. The shaft and ratchet combination has an axial passage 30 (FIG. 5), the ends of which are suitably, internally threaded.

The particular ratchet and pawl combination used does not form a part of the present invention and may be any known in the art. For example, the ratchet and pawl structures may be those disclosed in Blanch and Olzak U.S. Pat. No. 3,432,623 or in Blanch and Olzak U.S. Pat, No. 3,450,369. In the embodiment illustrated, flange 22 has a slanting ledge area 31 (FIG. 4) having a pair of punched-out tabs 32. Rivet 33 rotatably secures a pawl 34 to flange 22, and a coiled spring 35 connects an ear 36 of the pawl to one of the tabs 32. To reverse the operation of the pawl 34, that is, to go from a clockwise payout rotation to a counterclockwise payout rotation or vice versa, pawl 34 is turned over on its other side and spring 35 attached to the other tab 32, all in accordance with the teachings of the cited Blanch and Olzak U.S. Pat. No. 3,450,369.

On the other side of the wall member 13, the housing chamber 16 has a plastic, tubular projection 37 integrally formed with the wall member 13 and coaxial with the shaft opening 14. Internally, the projection 37 provides a bearing for shaft 21 and externally has an offset portion 38 defining a seat. Molded directly along the internal periphery of the plastic hub portion 10 of the housing chamber 16 are three axially disposed ribs 40, approximately 120° apart. The outer ends of the ribs have open notches 41. A disc-shaped commutator block 42 has a central opening 43 and radial tabs 44 which mate with the notches 41 of the ribs 40, preferably with a snap fit. The depth of the notches 41 is such that when the tabs 44 are properly seated, the commutator block 42 evenly fits around the projection 37 through its opening 43 and seats against the offset portion 38 of the projection. The side of the wall member 13 facing chamber 16 also has at least one pair of concentric, arcuate vanes 45 (FIG. 2) between which an electric cord may be inserted. In this manner, the vanes 45 relieve strain on the cord and particularly its connection to a commutator block as hereinafter described.

The commutator block 42 (FIGS. 6 and 7) is thinner than those usually used and comprises a heat-resistant, insulating plastic like the formaldehyde resins such as phenol-formaldehyde, urea-formaldehyde, melamine-formaldehyde, and the like. Flat metal rings 46 and 47 fit in each of two matching circular depressions. Each ring has a pair of opposed tabs 48 and 49 which extend through openings in the commutator block 42. FIG. 7 illustrates the disposition of the tabs 48 and 49 for ring 47 along the back of the block 42, tab 48 having a connecting, turned, flat portion, and tab 49 terminating short of the back of the block. Tabs 51 and 52 for ring 46 are similarly arranged. Small bolts 53 (FIG. 1) attach two connectors of an electric cord 54 to the turned, flat portions of tabs 48 and 51 of rings 47 and 46, respectively, and in this manner electrically connect the cord 54 to the commutator block 42. The cord 54 leaves chamber 16 by passing through an opening 55 (FIG. 3) in the hub portion 10 and winds around the exterior of the hub and between flanges 11 and 22.

While, if desired, an electric cord reel may be used with only the parts previously described in assembly and suitable electric means employed to supply electrical energy to the rings 46 and 47 of the commutator block 42, it is preferable for reasons of safety and appearance to encase the electric cord reel in a suitable housing having a peripheral opening through which the cord 54 may pass. The reel housing shown in the illustrated embodiment includes a pair of cooperating, bowl-shaped outer sections 56 and 57 held to the ends of shaft 21 by bolts 58 which engage the internal, threaded openings of the passage 30. In this respect, the second narrowing offset portion 28 on shaft 21 is preferably flush with the end of the tubular projection 37, so that if needed a collar 60 on a bolt 58 may suitably space section 56 from the reel structure and provide sufficient room for a contact block 61. An elastomeric band 62 has grooves along its sides to receive the edges of the sections 56 and 57 and thereby complete the housing.

An electric potential is supplied to the inner end of cord 54 through an inlet conductor 63 which enters section 56 through an offset portion 64 and connects its two leads 65 and 66 (FIGS. 1 and 8) to contact brushes 67 and 68, respectively, carried by the contact block 61. A rivet 70 secures block 61 to section 56, the block having an opening 71 freely to pass the shaft 21. The inner and outer commutator rings 47 and 46 engage the contact brushes 67 and 68, respectively, and thereby transfer an electric potential to the dual conductors of cord 54.

The reel assembly may be adapted for many applications. For example, the reel may be attached to the end of a tank-type vacuum cleaner. Inoperation, the electric cord 54 is pulled from the reel assembly against the resistance of the spirally coiled spring 17 until a sufficient length of cord has been paid out. As the reel slows in its rotation, the sharp end of the pawl 34 nests between two adjacent teeth of ratchet 24, thereby locking the ratchet and pawl with respect to each other. A release between these parts is accomplished by a short, outward tug on the cord 54. Thereafter, the energy stored in the tightened coiled spring 17 returns the cord onto the reel by rotating the reel in a reversed direction.

The present electric cord reel construction is easy to assemble, most parts fitting directly into either of the housing chambers 15 or 16. The reel is, therefore, well adapted for a production line technique. The number of rivets and bolts is substantially reduced. Soldering and welding are entirely eliminated from the reel structure itself, although in some instances the electrical leads of the cord 54 may be soldered to the tabs 48 and 51 of the rings 47 and 46.

Moreover, because of the use of many plastic component parts, no lubrication is required, and the rotation of the reel and shaft relatively to each other is smooth with little drag.

While the foregoing describes a presently preferred embodiment, it is understood that the invention may be practiced in still other forms within the scope of the following claims.

What is claimed is:

1. In an electric cord reel, a unitary construction member adapted to serve as a support for substantially the remaining parts of the reel, said unitary member comprising a plastic, generally tubular hub portion having a radially extending integral plastic flange adjacent one end, and an internal plastic wall member extending generally radially across the tubular hub portion to divide it into housing chambers on opposite sides of the wall member, a second flange secured adjacent the free end of the hub portion, a shaft extending through said flanges and wall member substantially coaxially of the tubular hub portion and adapted for relative rotation therewith, a coiled spring stationed in one of said housing chambers having portions thereof secured to the hub portion in said one chamber and to the shaft, a commutator block carried in the other of said housing chambers, at least one pair of integral, spaced-apart ribs extending from that side of the wall member facing the housing chamber containing the commutator block to serve as strain-relief means for insulated electric cord or the like, ratchet means carried by the shaft, and pawl means carried by one of said flanges engageable with said ratchet means.

2. In an electric cord reel, a unitary construction member adapted to serve as a support for substantially the remaining parts of the reel, said unitary member comprising a plastic, generally tubular hub portion having a radially extending integral plastic flange adjacent one end, and an internal plastic wall member extending generally radially across the tubular hub portion to divide it into housing chambers on opposite sides of the wall member, a second flange secured adjacent the free end of the hub portion, a plastic shaft having integral ratchet means adjacent one end extending its opposite end through said flanges and wall member substantially coaxially of the tubular hub portion and adapted for relative rotation therewith, a coiled spring stationed in one of said housing chambers having portions thereof secured to the hub portion in said one chamber and to the shaft, the internal periphery of the plastic hub portion of the other of said housing chambers having integrally formed, axially extending notched portions, a commutator block in said other housing chamber having tab portions adapted to seat in said notched portions, and pawl means carried with respect to a flange adjacent said ratchet means of the shaft for engagement therewith.

3. The electric cord reel construction of claim 2 wherein said plastic wall member has a shaft opening and an integral plastic hollow projection coaxial with said opening extending from the wall member into one of said housing chambers to define a bearing for said shaft.

4. The electric cord reel construction of claim 3 wherein said hollow projection extends into the housing chamber containing the commutator block, and said projection has an offset portion defining a seat for said block.

5. The electric cord reel construction of claim 3 wherein said hollow projection extends into the housing chamber containing the commutator block, and said shaft has an offset portion to seat against the other side of the wall member.

6. The electric cord reel construction of claim 2 wherein said commutator block is removable with respect to said notched portions.

7. The electric cord reel construction of claim 2 wherein said plastic wall member has a shaft opening and an integral, plastic, hollow projection coaxial with said opening extending from a side of the wall member into the housing chamber containing the commutator block to define a bearing for said shaft, and said plastic shaft has an offset portion to seat against the other side of the wall member.

8. The electric cord reel construction of claim 2 wherein said second flange has press fit on said free end of the hub portion.

9. The electric cord reel construction of claim 2 wherein the free end of said hub portion has a plurality of axially extending, circumferentially spaced tab portions, and said second flange has openings to receive said tab portions and mount the flange thereon.

10. The electric cord reel construction of claim 2 wherein said second flange is metallic.

11. The electric cord reel construction of claim 2 wherein that side of the wall member facing the housing chamber containing the coiled spring has an integral plastic rib extending therefrom for attachment with one of said portions of the spring to define said securance of the spring to the hub portion.

* * * * *